(12) United States Patent
Crockett

(10) Patent No.: US 7,813,980 B2
(45) Date of Patent: Oct. 12, 2010

(54) TOW CLAIMS SYSTEM FOR SECONDARY TOW AND SALVAGE MANAGEMENT

(76) Inventor: Bruce E. Crockett, 6400 Windsor Mill Rd., Baltimore, MD (US) 21207-6005

( * ) Notice: Subject to any disclaimer, the term of this patent is extended or adjusted under 35 U.S.C. 154(b) by 1218 days.

(21) Appl. No.: 11/347,843

(22) Filed: Feb. 6, 2006

(65) Prior Publication Data

US 2006/0190317 A1    Aug. 24, 2006

Related U.S. Application Data

(60) Provisional application No. 60/649,511, filed on Feb. 4, 2005.

(51) Int. Cl.
*G06Q 40/00* (2006.01)
*G06Q 10/00* (2006.01)
*G06Q 30/00* (2006.01)
*G05B 19/418* (2006.01)
*G06F 9/46* (2006.01)

(52) U.S. Cl. .............................. 705/35; 705/1.1; 705/8; 705/301; 705/333

(58) Field of Classification Search .................. 705/35, 705/1.1, 7, 8, 9, 301, 305, 308, 333
See application file for complete search history.

(56) References Cited

U.S. PATENT DOCUMENTS

2002/0065703 A1*    5/2002    Garg ............................. 705/9

OTHER PUBLICATIONS

TrackerManagement Retows, www.trackermanagement.com, Sep. 6, 2001.*

* cited by examiner

*Primary Examiner*—Shahid R Merchant
(74) *Attorney, Agent, or Firm*—Ober / Kaler; Royal W. Craig

(57) ABSTRACT

A method and system for unified secondary management of tow claims and salvage tow data, and specifically for simplifying the workflow of attending insurers, towers, and a manager (operator of an application service provider). The system is implemented in software form and includes an Insurance Company Module for allowing Clients to initiate tow dispatch orders into the system, a Tow Company Module for allowing towing vendors to view, execute and track tow dispatches assigned to them through the dispatch system, and a Management Module for allowing a third party Manager to manage the system, and to dispatch tow orders, track orders, approve completed orders for payment, and provide Client and Vendor account management, reports and performance tracking. Data extracted from all three modules is stored in a relational database and can readily be accessed by any of the three participants in real time, and may be edited and/or analyzed for reporting.

11 Claims, 29 Drawing Sheets towclaims.com

New Dispatch Order | Status | Sign Off

STEP 1: CREATE DISPATCH ORDER

DISPATCH ORDER

Claim No.

AUTHORIZATION

Handler Alias:

Date Authorized: 12/03/2004

TOW CHARGES

Tow Facility Contact:

Date Storage Charges Begin: [   ] MMDDYYYY

Tow Charge: 0.00

Daily Storage Rate: 0.00   Note: This is the per day storage rate

Miscellaneous Charges: 0.00

Comments:

VEHICLE INFORMATION

Owner's Name (Last, First):

Owner Phone:

Last 6 digits of VIN:

Year: Please select one

Make: Please select one

Make - Other:

Model:

Color: Please select one

Other Color:

Damage Area: Please make selections(s) / Front / Rear / Rollover / Left Front

Use the CTRL key to select more than one area of damage.

Damage Comments:

VEHICLE LOCATION

Tow Lot/Vehicle Location:

Street Address:

City:

State: Please select one

Zip Code:

Hours of Operation:

Phone Number:

Keys With Car: Please select one

If you select No - Please provide location of keys

TOW TO

Facility Name:

Street Address:

City:

State: Please select one

Zip Code:

Phone Number:

[Submit] [Reset]

FIG. 6 towclaims.com

| New Dispatch Order | Status | Sign Off |

Search by Claim Number

Enter the Claim Number: [      ]  [Search]

Closed Tow Requests - Last 30 Days

| Claim Number | Authorize Date/Time | Tow To | Vehicle Location |
|---|---|---|---|
| 09-5086-365 | 12/10/2004 08:55:27 AM | Tony's<br>1116 CONGRESS ST NE<br>WASHINGTON, DC<br>(202) 326-5944 | 2800 NEW MEXICO AVE NW<br>WASHINGTON, DC |
| 09-5086-094 | 12/10/2004 09:43:40 AM | Joe Conlon's<br>12041 NEBEL ST<br>ROCKVILLE, MD<br>(202) 576-6959 | 6001 GEORGIA AVE NW<br>WASHINGTON, DC |
| 20-5854-732 | 12/09/2004 11:23:52 AM | walker Mill auto collision<br>8472 WALKER MILL RD<br>CAPITAL HEIGHTS, MD<br>(301) 390-1043 | 7901 PARSTON DR<br>FORESTVILLE, MD |

FIG. 7 towclaims.com

New Dispatch Order · Status · Sign Off

DISPATCH ORDER DETAIL

CLAIM NO: 09-5086-364
DTE AUTH: 12/10/2004 08:55:27 AM
CLIENT: State Farm - State Farm BALT
HANDLER ID: jd2s
OWNER'S NAME/PHONE: Bowers, David
(202) 326-5994

VEHICLE INFORMATION

YR/MK/MDL: 1991 / Honda/ Accord
YR OTH/MK OTH/MDL OTH:
VIN ID: 000263
STATE/TAG NO: DC BL6651
COLOR: Gold
DMG AREA: Other
DMG DETAIL: Ignition damage

FEES DUE AT PICKUP

DATE IN YD: 11/27/2004
DAILY RTE: 0.00
TOW CHG: 0
MISC CHG: 0.00
TOTAL DUE: $0.00
COMMENTS: Please contact Mr. Bowers for any better directions you may need to pick up vehicle.
AUTHORIZED MILEAGE: 7

VEHICLE LOCATION

ADDRESS: Near Residence
2800 NEW MEXICO AVE NW
WASHINGTON DC 20007

TOW DESTINATION

ADDRESS: Tony's
1116 CONGRESS ST NE
WASHINGTON DC 20002

FIG. 8 towclaims.com

| New Dispatches | Track Status | Manage Users | ACH | Reports | Sign Off | | |
|---|---|---|---|---|---|---|---|
| 20-5841-874 | View Invoice | 11/09/2004 09:02:18 AM<br>11/09/2004 03:33:19 PM | Hunt Valley<br>Towing | TOWSON FORD<br>926 YORK ROAD<br>TOWSON, MD<br>(410) 977-1095 | 606 DOOLAN COURT<br>TIMONIUM, MD | | |
| 20-5841-412 | View Invoice | 11/09/2004 09:09:50 AM<br>11/09/2004 01:59:39 PM | J & J Towing | mike's auto body<br>2431 old washington rd<br>waldorf, MD<br>(301) 893-8414 | 42 keepsake place<br>waldorf, MD | | |
| 20-5842-136-01 | View Invoice | 11/09/2004 09:26:15 AM<br>11/09/2004 11:22:23 AM | Frankford<br>Towing | BAYSIDE AUTOBODY<br>310 EASTERN AVE<br>BALTIMORE, MD<br>(443) 904-7214 | 8515 KELSO DRIVE<br>BALTIMORE, MD | | |
| 04-4076817 | View Invoice | 11/09/2004 09:29:08 AM<br>11/09/2004 02:33:26 PM | Al's Towing | CHESAPEAKE<br>COLLISION<br>9825 LIBERTY ROAD<br>RANDALLSTOWN, MD<br>(301 419-2865 | 7131 VIRGINA<br>MANOR COURT<br>LAUREL, MD | | |
| 20-5839-551 | View Invoice | 11/09/2004 10:07:39 AM<br>11/09/2004 01:58:03 PM | Preferred<br>Towing | darcars ford lanham<br>9020 lanham severn rd.<br>lanham, MD<br>(301) 429-9630 | 7515 buchanan st.<br>hyattsville, MD | | |
| 27-7484-157 | View Invoice | 11/09/2004 10:23:14 AM<br>11/09/2004 03:33:19 PM | Security<br>Towing | Russel<br>6624 Balto Natl Pike<br>Baltimore, MD<br>(000) 000-0000 | St Paul & Center Sts<br>Baltimore, MD | | |

FIG. 9 towclaims.com

| New Dispatches | In Process | Complete | Sign Off |

DISPATCH ORDER DETAIL

CLAIM NO: 20-5854-592
DTE AUTH: 12/08/2004 06:12:04 PM
CLIENT: State Farm - State Farm BALT
HANDLER ID: nstj
OWNER'S NAME/PHONE: Diggs, Thomas
(240) 449-0213

VEHICLE INFORMATION     FEES DUE AT PICKUP

YR/MK/MDL: 2003 / Motorcycle / 1450 CC     DATE IN YD: 12/08/2004
VIN ID: 728982     DAILY RTE: 45.00
YR OTH/MK OTH/MDL OTH: Harley Davidson     TOW CHG: 110
STATE/TAG NO: MD 899D93     MISC CHG: 0.00
COLOR: Blue     TOTAL DUE: $200.00
DMG AREA: Front     COMMENTS: Please call Anna before coming.
DMG DETAIL:

AUTHORIZED MILEAGE: 7

VEHICLE LOCATION     TOW DESTINATION

ADDRESS: AKJ TOWING     ADDRESS: Harley Davidson dealership
55 DERWOOD CIR     7830 AIRPARK RD
ROCKVILLE, MD 20850     GAITHERSBURG, MD 20879

FIG. 10 towclaims.com

| New Dispatch Order | Status | Reports | Sign Off |

TOWCLAIMS CLIENT MANAGEMENT REPORTS / ORDER SEARCH

SEARCH BY CLAIM NUMBER

ENTER THE CLAIM NUMBER: [          ]  [Search]

CREATE REPORT BY HANDLER ID

ENTER BEGIN DATE: [12/10/2004]
ENTER END DATE: [12/10/2004]
ORDER BY: [Order Date ▾]

[GO!]

CREATE MANAGEMENT REPORT

ENTER BEGIN DATE: [12/10/2004]
ENTER END DATE: [12/10/2004]
ORDER BY: [Order Date ▾]

[GO!]

FIG. 12 towclaims.com

| New Dispatch Order | Status | Reports | Sign Off |

BEC CLIENT MANAGEMENT REPORT
For The Period 11/10/2004 through 12/10/2004

| ORDER DATE | CLAIM NUMBER | HANDLER ID | PRIMARY TOW COST | SECONDARY TOW COST | TOTAL TOW COST | BEC TURNAROUND | ACTUAL MILES | TOTAL DAYS IN STORAGE | REASONS FOR SEC TOW COSTS |
|---|---|---|---|---|---|---|---|---|---|
| 12/02/2004 | 20-5851-686 | a6wg | $0.00 | $85.00 | $85.00 | 0 | 2 | 0 | |
| 12/06/2004 | 20-5853-327 | a6wg | $0.00 | $85.00 | $85.00 | 0 | 4 | 0 | |
| 12/06/2004 | 20-5847-248 | a6wg | $0.00 | $85.00 | $85.00 | 1 | 2 | 0 | |
| 11/12/2004 | 20-5844-313 | a6wg | $209.00 | $85.00 | $294.00 | 0 | 2 | 3 | |
| 11/10/2004 | 20-5843-396 | a6wg | $0.00 | $85.00 | $85.00 | 1 | 0 | 3 | |
| 11/30/2004 | 20-5849-633 | a6wg | $350.00 | $85.00 | $435.00 | 0 | 5 | 5 | |
| 11/15/2004 | 20-5844-801 | a7ic | $0.00 | $85.00 | $85.00 | 0 | 8 | 0 | |
| 11/29/2004 | 20-5850-227 | a7ic | $620.00 | $85.00 | $705.00 | 0 | 4 | 3 | |
| 12/07/2004 | 20-5853-884 | a0q | $0.00 | $85.00 | $109.00 | 1 | 18 | 0 | Additional Mileage $24.00 |

FIG. 13 towclaims.com

| New Dispatch Order | Status | Reports | | Sign Off | | | | |
|---|---|---|---|---|---|---|---|---|

DATA FOR HANDLER ID: a7ic

| ORDER DATE | CLAIM NUMBER | HANDLER ID | PRIMARY TOW COST | SECONDARY TOW COST | TOTAL TOW COST | BEC REVENUE | BEC TURNAROUND | TOTAL DAYS IN STORAGE |
|---|---|---|---|---|---|---|---|---|
| 11/15/2004 | 20-5844-801 | a7ic | $0.00 | $85.00 | $85.00 | $30.00 | 0 | 0 |
| 11/29/2004 | 20-5850-227 | a7ic | $620.00 | $85.00 | $705.00 | $30.00 | 0 | 3 |

TOTAL CLAIMS PROCESSED 2

DATA FOR HANDLER ID: af0q

| ORDER DATE | CLAIM NUMBER | HANDLER ID | PRIMARY TOW COST | SECONDARY TOW COST | TOTAL TOW COST | BEC REVENUE | BEC TURNAROUND | TOTAL DAYS IN STORAGE |
|---|---|---|---|---|---|---|---|---|
| 12/07/2004 | 20-5853-884 | af0q | $0.00 | $109.00 | $109.00 | $38.00 | 1 | 0 |

TOTAL CLAIMS PROCESSED 1

DATA FOR HANDLER ID: am9p

| ORDER DATE | CLAIM NUMBER | HANDLER ID | PRIMARY TOW COST | SECONDARY TOW COST | TOTAL TOW COST | BEC REVENUE | BEC TURNAROUND | TOTAL DAYS IN STORAGE |
|---|---|---|---|---|---|---|---|---|
| 12/05/2004 | 20-5853-359 | am9p | $234.00 | $160.00 | $394.00 | $55.00 | 1 | 3 |

FIG. 14 towclaims.com

New Dispatches    In Process    Complete    Sign Off

In Process Tow Requests

| Claim Number | Assigned Date/Time | Tow To | Vehicle Location |
|---|---|---|---|
| 20-5854-592 | 12/08/2004 06:51:55 PM | Harley Davidson dealership<br>7830 AIRPARK RD<br>GAITHERSBURG, MD<br>(301) 774-0595 | 55 DERWOOD CIR<br>ROCKVILLE, MD |

FIG. 15

P:\2004\BECManagement\sql_exports\db1.mdb  Friday, December 10, 2004
Table: applicants  Page: 1

Properties
DateCreated: 12/10/2004 11:10:30 AM  LastUpdated: 12/10/2004 11:10:30 AM
RecordCount: 25  Updatable: True

Columns

| Name | Type | Size |
|---|---|---|
| aid | Long Integer | 4 |
| appdate | Text | 90 |
| name | Text | 50 |
| address1 | Text | 50 |
| address2 | Text | 50 |
| city | Text | 50 |
| state | Text | 10 |
| zip | Text | 10 |
| phone | Text | 12 |
| fax | Text | 12 |
| email | Text | 50 |
| fleet | Text | 10 |
| contactname | Text | 50 |
| hrsop | Text | 50 |
| zipcodearea | Text | 255 |
| comments | Text | 255 |
| status | Text | 50 |

FIG. 16(A)

P:\2004\BECManagement\sql_exports\db1.mdb         Friday, December 10, 2004
Table: billing         Page: 2

Properties

| | | | |
|---|---|---|---|
| DateCreated: | 12/10/2004 11:10:30 AM | LastUpdated: | 12/10/2004 11:10:30 AM |
| RecordCount: | 160 | Updatable: | True |

Columns

| Name | Type | Size |
|---|---|---|
| id | Long Integer | 4 |
| dispatchid | Text | 10 |
| claim | Text | 50 |
| idate | Text | 12 |
| clientid | Text | 10 |
| amtdue | Text | 10 |
| takenby | Text | 50 |
| authorize | Text | 10 |

FIG. 16 (B)

P:\2004\BECManagement\sql_exports\db1.mdb            Friday, December 10, 2004
Table: color            Page: 3

Properties
DateCreated:    12/10/2004 11:10:30 AM    LastUpdated:    12/10/2004 11:10:30 AM
RecordCount:    18    Updatable:    True

Columns

| Name | Type | Size |
|---|---|---|
| ID | Long Integer | 4 |
| color | Text | 50 |

FIG. 16 (C)

P:\2004\BECManagement\sql_exports\db1.mdb　　　　　　　　　　　　　　Friday, December 10, 2004
Table: Company　　　　　　　　　　　　　　　　　　　　　　　　　　　　　　Page: 4

Properties

DateCreated:　　12/10/2004 8:49:32 AM　　LastUpdated:　　12/10/2004 8:49:33 AM
RecordCount:　　47　　　　　　　　　　　　Updatable:　　　True

Columns

| Name | Type | Size |
|---|---|---|
| ID | Long Integer | 4 |
| CompanyID | Long Integer | 4 |
| Clientcomp | Text | 255 |
| Region | Text | 255 |
| Name | Text | 255 |
| Address1 | Text | 255 |
| Address2 | Text | 255 |
| City | Text | 255 |
| State | Text | 255 |
| Zip | Text | 255 |
| Phone | Text | 255 |
| Fax | Text | 255 |
| Email | Text | 255 |
| ContactName | Text | 255 |
| HrsOp | Text | 255 |
| ZipCodeArea | Memo | - |
| VendorTowFee | Text | 255 |
| VNOB | Text | 255 |
| VABA | Text | 255 |
| VACCT | Text | 255 |
| VACTTYPE | Text | 255 |
| CTYPE | Text | 255 |
| status | Text | 255 |
| emailformat | Text | 255 |
| fleet | Text | 255 |

FIG. 16 (D)

P:\2004\BECManagement\sql_exports\db1.mdb  
Table: Dispatch

Friday, December 10, 2004  
Page: 5

Properties

| | | | |
|---|---|---|---|
| DateCreated: | 12/10/2004 8:52:27 AM | LastUpdated: | 12/10/2004 8:52:29 AM |
| RecordCount: | 1547 | Updatable: | True |

Columns

| Name | Type | Size |
|---|---|---|
| ID1 | Long Integer | 4 |
| ID | Long Integer | 4 |
| status | Text | 255 |
| claim | Text | 255 |
| clientid | Text | 255 |
| owner | Text | 255 |
| ownphone | Text | 255 |
| authorize | Text | 255 |
| authorizedate | Text | 255 |
| authorizetime | Text | 255 |
| ordertime | Text | 255 |
| towcontact | Text | 255 |
| storagedate | Text | 255 |
| towcharge | Long Integer | 4 |
| storage | Text | 255 |
| misccharge | Text | 255 |
| comment | Text | 255 |
| vin | Text | 255 |
| year | Text | 255 |
| make | Text | 255 |
| makeother | Text | 255 |
| model | Text | 255 |
| color | Text | 255 |
| othercolor | Text | 255 |
| licensetag | Text | 255 |
| licensestate | Text | 255 |
| colcode | Text | 255 |
| damagearea | Text | 255 |
| damagedet | Text | 255 |
| llname | Text | 255 |
| address | Text | 255 |
| city | Text | 255 |
| state | Text | 255 |
| zip | Text | 255 |
| hours | Text | 255 |
| phonenum | Text | 255 |
| keys | Text | 255 |
| otherkeys | Text | 255 |
| towplace | Text | 255 |
| towaddress | Text | 255 |
| towcity | Text | 255 |
| towstate | Text | 255 |
| towzip | Text | 255 |
| TPPhone | Text | 255 |

FIG. 16 (E)

| P:\2004\BECManagement\sql_exports\db1.mdb | | Friday, December 10, 2004 |
|---|---|---|
| Table: Dispatch | | Page: 6 |
| TakenBy | Text | 255 |
| AssignedBy | Text | 255 |
| AssignedTo | Text | 255 |
| CompanyID | Text | 255 |
| WhenAssigned | Text | 255 |
| AcceptDeclineBy | Text | 255 |
| AcceptDeclineWhen | Text | 255 |
| AcceptTow | Text | 255 |
| Comments | Text | 255 |
| CompletedBy | Text | 255 |
| CompletedWhen | Text | 255 |
| AmtPaid | Text | 255 |
| wdreasons | Text | 255 |
| WhyDiff | Text | 255 |
| CompComments | Text | 255 |
| ReviewAmts | Text | 255 |
| EstimatedMiles | Text | 255 |
| ActualMiles | Text | 255 |
| Adj | Text | 255 |
| tolls | Text | 255 |
| tcadj | Text | 255 |
| paymentadj | Text | 255 |
| payoutimg | Text | 255 |
| dayadj | Text | 255 |

FIG. 16 (F)

P:\2004\BECManagement\sql_exports\db1.mdb　　　　　　　　　　　　　　　　　　　Friday, December 10, 2004
Table: email　　　　　　　　　　　　　　　　　　　　　　　　　　　　　　　　　　　　　Page: 7

Properties

| | | | |
|---|---|---|---|
| DateCreated: | 12/10/2004 11:10:34 AM | LastUpdated: | 12/10/2004 11:10:34 AM |
| RecordCount: | 28 | Updatable: | True |

Columns

| Name | Type | Size |
|---|---|---|
| Email | Text | 150 |

FIG. 16 (G)

P:\2004\BECManagement\sql_exports\db1.mdb               Friday, December 10, 2004
Table: make                                                                Page: 8

Properties
DateCreated:    12/10/2004 11:10:34 AM    LastUpdated:    12/10/2004 11:10:34 AM
RecordCount:    47                        Updatable:      True

Columns

| Name | Type | Size |
|---|---|---|
| ID | Long Integer | 4 |
| make | Text | 50 |

FIG. 16 (H)

P:\2004\BECManagement\sql_exports\db1.mdb  Friday, December 10, 2004
Table: Payments  Page: 9

Properties

| | | | |
|---|---|---|---|
| DateCreated: | 12/10/2004 8:58:33 AM | LastUpdated: | 12/10/2004 8:58:34 AM |
| RecordCount: | 1479 | Updatable: | True |

Columns

| Name | Type | Size |
|---|---|---|
| ID | Long Integer | 4 |
| PID | Long Integer | 4 |
| COMPANYID | Text | 255 |
| AMT | Text | 255 |
| AUTHBY | Text | 255 |
| AUTHDATE | Text | 255 |
| PAYCLAIM | Text | 255 |
| CLAIM | Text | 255 |
| PSTATUS | Text | 255 |
| approvalnotes | Text | 255 |
| QBStatus | Text | 255 |

FIG. 16 (I)

P:\2004\BECManagement\sql_exports\db1.mdb  Friday, December 10, 2004
Table: QBEntries  Page: 10

Properties
DateCreated: 12/10/2004 11:10:36 AM  LastUpdated: 12/10/2004 11:10:36 AM
RecordCount: 3  Updatable: True

Columns

| Name | Type | Size |
|---|---|---|
| ClientID | Long Integer | 4 |
| CName | Text | 50 |
| QBEntry | Text | 50 |
| Status | Yes/No | 1 |

FIG. 16 (J)

P:\2004\BECManagement\sql_exports\db1.mdb　　　　　　　　　　　　　　　　　Friday, December 10, 2004
Table: Receipts　　　　　　　　　　　　　　　　　　　　　　　　　　　　　　　　　Page: 11

Properties

| | | | |
|---|---|---|---|
| DateCreated: | 12/10/2004 9:00:17 AM | LastUpdated: | 12/10/2004 9:00:18 AM |
| RecordCount: | 1591 | Updatable: | True |

Columns

| Name | Type | Size |
|---|---|---|
| ID | Long Integer | 4 |
| RID | Long Integer | 4 |
| ClientID | Text | 255 |
| Claim | Text | 255 |
| Paydate | Text | 255 |
| receipt | Text | 255 |
| ptype | Text | 255 |
| QBStatus | Text | 255 |

FIG. 16 (K)

P:\2004\BECManagement\sql_exports\db1.mdb　　　　　　　　　　　　　　　　　　　　Friday, December 10, 2004
Table: states　　　　　　　　　　　　　　　　　　　　　　　　　　　　　　　　　　　　　Page: 12

Properties
| | | | |
|---|---|---|---|
| DateCreated: | 12/10/2004 11:10:36 AM | LastUpdated: | 12/10/2004 11:10:36 AM |
| RecordCount: | 51 | Updatable: | True |

Columns

| Name | Type | Size |
|---|---|---|
| ID | Long Integer | 4 |
| State | Text | 3 |
| Longstate | Text | 50 |
| Country | Text | 50 |

FIG. 16 (L)

P:\2004\BECManagement\sql_exports\db1.mdb  Friday, December 10, 2004
Table: Users  Page: 13

Properties

DateCreated: 12/10/2004 9:03:52 AM  LastUpdated: 12/10/2004 9:03:53 AM
RecordCount: 204  Updatable: True

Columns

| Name | Type | Size |
|---|---|---|
| ID1 | Long Integer | 4 |
| ID | Long Integer | 4 |
| CompanyID | Long Integer | 4 |
| CompanyName | Text | 255 |
| FirstName | Text | 255 |
| MI | Text | 255 |
| LastName | Text | 255 |
| Login | Text | 255 |
| Password | Text | 255 |
| UserType | Text | 255 |
| Active | Text | 255 |

FIG. 16 (M)

P:\2004\BECManagement\sql_exports\db1.mdb   Friday, December 10, 2004
Table: year   Page: 14

Properties
DateCreated:   12/10/2004 11:10:37 AM   LastUpdated:   12/10/2004 11:10:37 AM
RecordCount:   27   Updatable:   True

Columns

| Name | Type | Size |
|---|---|---|
| ID | Long Integer | 4 |
| year | Text | 50 |

FIG. 16 (N)

TOW CLAIMS SYSTEM FOR SECONDARY TOW AND SALVAGE MANAGEMENT

CROSS-REFERENCE TO RELATED APPLICATION(S)

The present application derives priority from U.S. Provisional Patent Application No. 60/649,511, filed Feb. 4, 2005.

BACKGROUND OF THE INVENTION

1. Field of the Invention

The present invention relates to systems and methods for managing towing and salvage claims and, more specifically, to a unified web-implemented tow claims system specifically adapted for secondary tow and salvage management.

2. Description of the Background

There are a number of existing software solutions for the towing and vehicle salvage industry. For example, ProTow 7.0 is a shrink-wrap software package for towing companies that manages dispatching, tow truck monitoring, ticket status, vehicle release status, etc. However, this and like systems require a tower to purchase computer hardware with sufficient storage capacity for all the necessary records.

There are also a few internet-based towing packages offered by application service providers ("ASPs"). Dispatch Anywhere! by Beacon Software also offers a tow management solution to towing companies for dispatching, tow truck monitoring, ticket status, etc. This program is made available to subscriber towing companies by web portal.

There are even a few known solutions for third party management of towing services. These are necessary when a third party provider or referral service takes tow claims and distributes them to independent towing companies. AAA® is perhaps the best-known third party provider, and Service Stations Computer Systems, Inc. and other software vendors offer subscriber AAA clubs a Digital Dispatch web-based product that manages call taking, dispatching, two-way text messaging, storage lot inventory, driver scheduling and a bookkeeping interface that produces driver/mechanic commissions, inventory control, repair orders, customer follow-up, A/R, A/P and Profit & Loss, all via the Internet. All of the data is housed on Digital Dispatch's servers, and the AAA agents need only a personal computer meeting minimal technical requirements.

Similarly, U.S. Patent Application 20020065703 by Garg published May 30, 2002 discloses an ASP-based software method for managing tow tracking and dispatch. This system allows a tower with a computer connection to use the computer connection to access a database that is maintained by an ASP. The system is also capable of integrating with other dispatch and tracking systems if, for example, an insurance company desires to inspect a vehicle it had towed for hidden damage or track storage costs. While it is not clear how the system integrates, it presumably allows export of database information into the insurance company's own system. This presumes that an insurer has a tow management system A Primary or Initial tow includes services provided as the result of an initial call, often from Police after accidents, incidents, disabled vehicles, and impound requests, all for a particular vehicle. A "Secondary tow" means towing services from an operator's storage facility or place of business, after a primary tow, to another location designated by the owner/agent of a vehicle that was initially towed as a result of call from the Police. A "Salvage tow" means towing services to move a total loss vehicle.

Today, insurance companies spend approximately $1.2 billion per year in towing-related expenses during the claims process, and these costs are higher than necessary. Secondary and salvage towing costs (those absorbed by an insurer) historically have been left unmanaged by insurance companies. This is due to the fact that secondary tows are typically arranged/ordered through various towing companies without negotiated or preferred pricing, nor service management. Accountability for these costs scarcely exists since there are no formal record keeping/tracking systems on the insurer side. The Garg patent does not disclose any management functions for the insurer, and hence fails to provide an integrated system designed to coordinate the efforts of the third party software application service provider (ASP), tow operator and insurer, allowing all three parties to manage their own towing needs and costs.

It would be greatly advantageous to provide a web-based software solution that gives a single order point for secondary and salvage tows for the insurance industry to: 1) enable insurance company "Clients" (and their agents) to manage secondary tow costs through pre-negotiated pricing, geographic based dispatching, and accountability of tow vendors; 2) provide tow company "Vendors" (actual tow truck companies) to view, execute and track tow dispatches which have been assigned to them through the tow claims dispatch system; and 3) provide a third party ASP or "Manager" with management capability to implement and manage the unified tow claims system via a web portal, inclusive of dispatching tow orders, tracking orders, approving completed orders for payment, and generating account management, reports, performance tracking and other reports. A unified ASP-implemented three-party-participant system would simplify the workflow of attending insurance agents, tow operators, and other providers.

SUMMARY OF THE INVENTION

It is therefore an object of the present invention to provide a unified tow management system for entry and management of tow claims, and specifically for simplifying and coordinating the workflow of tow company "Vendors", insurance company "Clients" and a third party ASP "Manager".

It is another object to provide a tow claims system specifically adapted for secondary and salvage tow management by the insurance industry, e.g., to enable the insurance company "Clients" (and their agents) to manage secondary tow costs through pre-negotiated pricing, geographic based dispatching, and accountability of tow vendors, and to provide them with real time data entry, claims initiation and deployment, and cost tracking and management reports through a web based interface.

It is still another object to provide a unified tow management system as described above that allows tow company "Vendors" (actual tow truck companies) to view, execute and track tow dispatches which have been assigned to them through the tow claims dispatch system.

It is yet another object to provide a unified tow management system as described above that allows a third party application service provider or "Manager" to implement and manage the tow claims system via a web portal, thereby dispatching tow orders, tracking orders, approving completed orders for payment, and providing Client and Vendor account management, reports, and performance tracking.

In accordance with the foregoing objects, the present invention is a unified tow claims management system specifically adapted for secondary tow management by the insurance industry for entry and management of tow claims data, and specifically for simplifying the workflow of the three participating user groups: insurance company "Clients"; tow company "Vendors", and a third party application service provider or "Manager". The present system accomplishes the foregoing with a web-implemented software solution comprising three modules: 1) An Insurance Company Module for allowing Clients to initiate tow dispatch orders into the system; 2) a Tow Company Module for allowing "Vendors" to view, execute and track tow dispatches which have been assigned to them through the tow claims dispatch system; and 3) a Management Module for allowing a "Manager" to implement and manage the tow claims system, and to dispatch tow orders, track orders, approve completed orders for payment, and provide Client and Vendor account management, reports and performance tracking.

The three modules are constructed atop a foundation comprising a specific relational database design, each module including a simple user interface that allow direct data entry and forms generation based on the database contents. The database stores the data extracted from the Management Module, Vendor Module, and Client Modules, inclusive of dispatch order information, tow authorization information, tow charges, vehicle information, vehicle location, and tow-to location. All this information can readily be accessed by any of the three participants in real time, and edited or analyzed for reporting.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 6 is a screen print of the Dispatch Order entry screen for allowing Clients 10 to enter and/or edit Dispatch Orders.

FIG. 7 is a screen print of the Closed Tow Request review screen for allowing Clients 10 to review closed Dispatch Orders.

FIG. 8 is a screen print of a closed tow detail screen.

FIG. 9 is a screen print of the Track Status Screen for allowing Clients 10 to review all open and closed Dispatch Orders.

FIG. 10 is a screen print of the Invoice Detail Screen for allowing Clients 10 to review any given Invoice listed in FIG. 9.

FIG. 12 is an exemplary Manager-level Client 10 Report generated from the screen of FIG. 11, sorted by date interval.

FIG. 13 is an exemplary Manager-level Client 10 Report generated from the screen of FIG. 11, sorted by Handler ID and filtered by date interval.

FIG. 14 is a screen print of the Dispatch Order Screen.

FIG. 15 is a screen print of a Dispatch Order detail screen.

FIGS. 16 (A-N) is collectively is a table printout of all database tables listing all fields within each table of the present database.

DETAILED DESCRIPTION OF THE PREFERRED EMBODIMENTS

The present invention is a tow claims system specifically adapted for secondary tow and salvage management by the insurance industry, e.g., to enable the insurance companies (and their agents) to manage secondary towing and salvage costs through pre-negotiated pricing, geographic based dispatching, and accountability of tow vendors. Additionally, the tow claims system provides real time data entry, claims initiation and deployment, and cost tracking and management reports through its web based interfaces. This simplifies the workflow of attending insurance agents, tow operators, and other providers.

Figure 1:
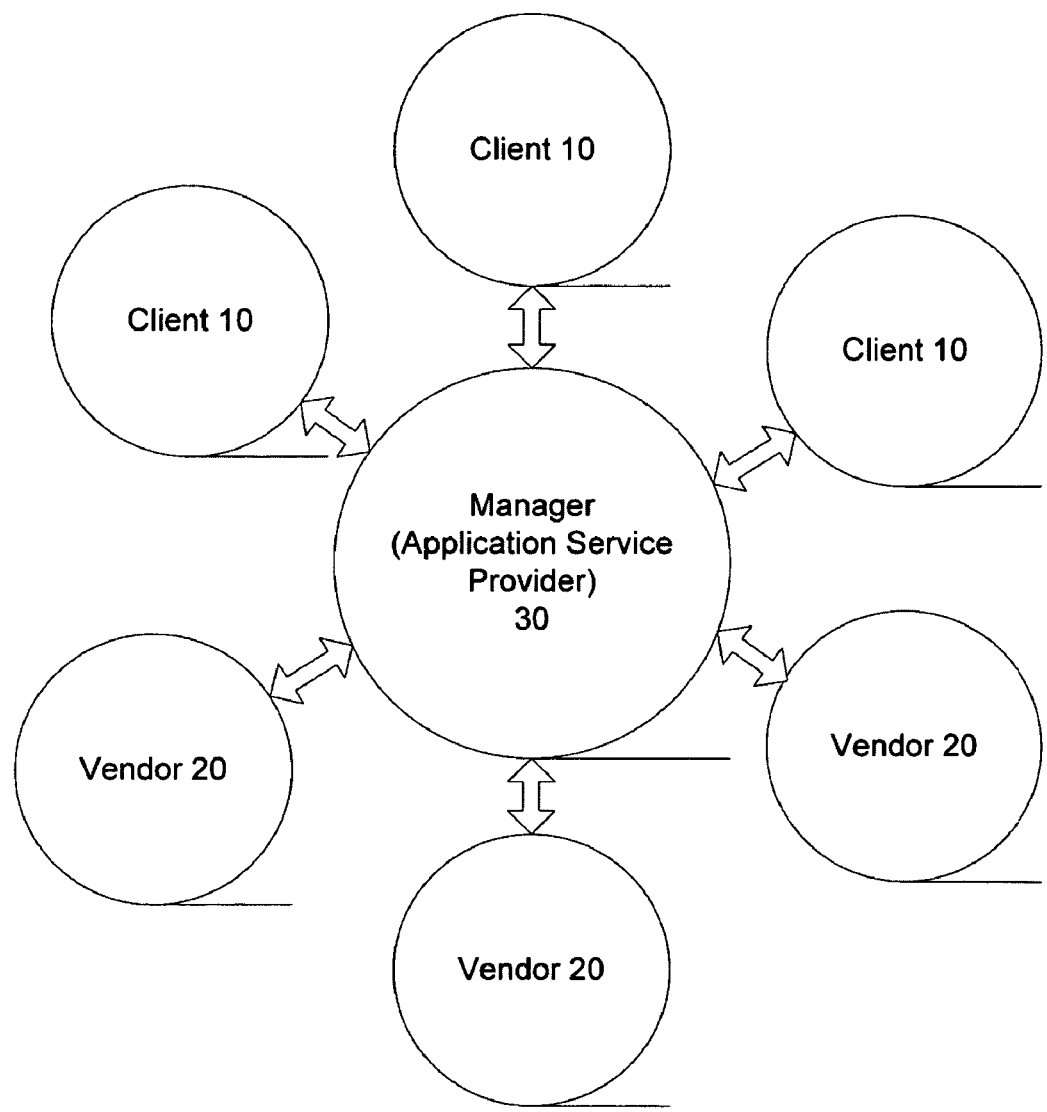
FIG. 1 is a block diagram illustrating the communications and workflow among the three participants.

FIG. 1 is a block diagram illustrating the communications and workflow among the three primary participants. The participants include one or more subscribing insurance companies "Clients" 10, one or more subscribing towing companies "Vendors" 20, and a third party application service provider or "Manager" 30. All electronic communications are bi-directional, implemented via one or more back-end web-enabled servers maintained at the ASP Manager 30 site and communicating over the Internet 30. The back-end ASP Manager 30 server(s) may run on a web-enabled Microsoft platform, such as Windows 2000 Advanced Server edition and MS SQL Server 2000. Data extracted from the three modules (to be described) populates an SQL database with the information. The Vendors 20 and Clients 10 can use any remote computer equipped with a conventional web browser. In general operation, all of the Vendors 20, Clients 10, and Manager 30 may log on to the Internet and access their dedicated customized web pages located on the ASP web server, using their respective web browsers.

Figure 2:
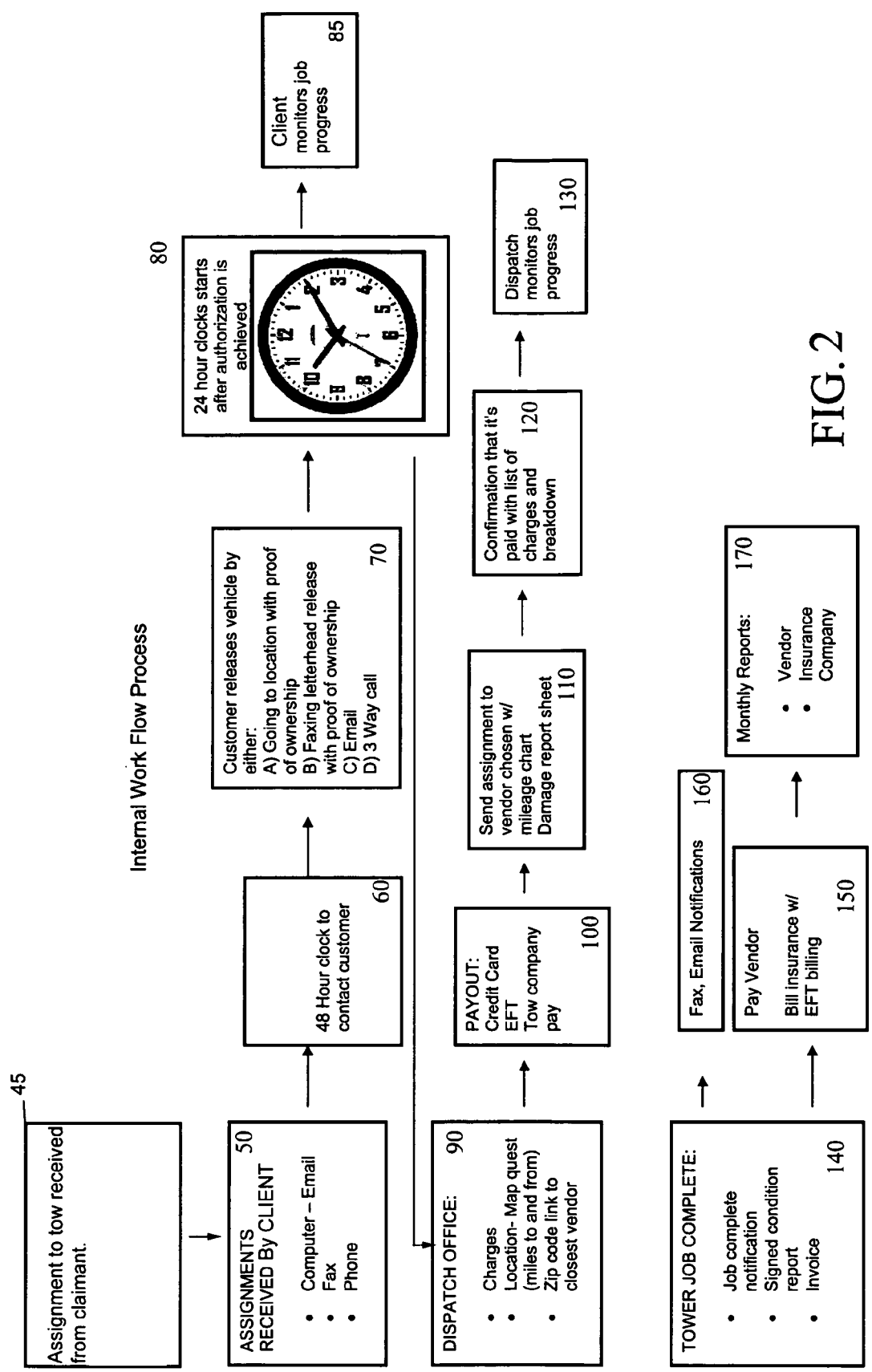
FIG. 2 is a more detailed diagram illustrating the internal work flow method of the present system.

FIG. 2 is a more detailed diagram illustrating the internal work flow process of the present system.

Initially, at step 45, a tow assignment is forwarded by a customer ("vehicle owner"). Tow assignments may be forwarded by computer email, fax, or telephone, and are most typically called in.

At step 50, the tow assignment is received by Client 10 who is then responsible for getting the customer's vehicle towed. Client 10 enters the assignment into the present system using their respective web browser.

In accordance with the present invention, entry of the assignment triggers a 48 Hour clock at step 60 within which "owner consent" must be obtained. Typically, the vehicle will be impounded or at a savage yard, and cannot be moved without obtaining the owner's consent along with payment for the primary tow, storage fees, and any miscellaneous charges that must be paid to get the vehicle released from the impound lot. In accordance with the present method, the Client 10 determines the amount of the "Payout" (the payment due for the primary tow, storage fees, and any miscellaneous charges) by calling the operator of the impound lot where the vehicle is located. Then the Client 10 contacts the owner directly. An important customer service aspect of the present method is that the Client 10 or their agent will solicit the vehicle release/authorization directly when communicating with the claimant. Thus, the authorization for the tow is obtained directly by the Client 10 or their agent at the outset, saving considerable time and impound costs.

At step 70, the customer releases the vehicle by either: 1) Going to the Client 10 location with proof of ownership; 2)

faxing a letterhead release to the Client 10 with proof of ownership; 3) by email; or 4) by 3-Way call.

At this point, the tow assignment, details of the tow authorization, and Payout amount are entered into the Client's user interface, and at step 80 a 24-hour clocks starts within which the secondary tow must be completed.

At step 90, the assignment and vehicle release authorization are communicated to the Manager 30 at the dispatch office. The Manager 30 calculates the location of the vehicle (such as, for example, using Map Quest® or other mapping service, calculates the towing charge, and identifies the closest subscribing Vendor 20 as well as miles to and from. The selected Vendor 20 is electronically notified of the assignment and proceeds to the site of the primary tow for his secondary tow.

There are two payment steps involved in a secondary tow under the present system. The first payment occurs when the tow Vendor 20 picks up the vehicle at the tow yard or impound lot. The Vendor 20 will pay the "Payout" to the impound lot operator to get the vehicle released. An important "checks and balances" aspect of the present system is that the Payout has typically been an area where costs have been unmanaged. Under the present system the Client 10 or Client agent has already determined the Payout prior to the Tow Vendor 20 picking up the vehicle, so that when the Vendor 20 arrives this information is reflected on the assignment and there is a double verification of fees for the Primary Tow.

At step 100, Manager 30 then charges payment for the Payout to the Client 10 electronically. At step 110, Manager 30 forwards Payout details to the selected Vendor 20 along with the assignment and a mileage chart, and damage report sheet.

At step 120, the Vendor 20 pays the Payout and forwards confirmation to Manager 30 that the Payout cost has been paid by the Vendor 20 with list of charges and breakdown. Differences in the amount of Payout quoted to the Client 10 and what the Tow Vendor 20 actually pays must be substantiated and explained. Once the Manager 30 is satisfied he reimburses the tow company Vendor 20 in like manner.

The Vendor then executes the tow, and at step 130 the Manager 30 monitors the job progress to completion.

At step 140, when the tow job is complete, the tower inputs a "job complete notification" into the system. At step 160, a fax and/or email notification is transmitted back to the Manager 30, who then submits electronic payment for the secondary tow to the Vendor 20 at step 150 and sends an electronic invoice to the Client 10. Finally, at step 170, the Manager compiles monthly reports for forwarding to both Clients 10 and Vendors 20.

Additionally, at step 85 the Client 10 can review closed claims at any time and view the complete order, mileage calculation (via Mapquest™), an Adobe .PDF copy of the original tow receipt, and all details related to the tow. This data is essential because it allows for auditing by the insurance company Client 10.

The foregoing workflow is implemented in software form that includes three website modules directed to serving three different user groups: 1) An Insurance Company Module for allowing Insurance Company "Clients" to initiate tow dispatch orders into the system; 2) A Tow Company Module for allowing tow company "Vendors" (actual tow truck companies) to view, execute and track tow dispatches which have been assigned to them through the tow claims dispatch system; and 3) a Management Module for allowing a third party application service provider or "Manager" to implement and manage the tow claims system via a web portal. Managers in this group dispatch tow orders, track orders, and approve completed orders for payment. Additional tasks by Managers include Client and Vendor account management, reports, and performance tracking.

The three web modules provide simple user interfaces for each of the three participants that allow direct data entry and forms generation, all three modules deriving data from an underlying web-enabled database with a specific database design. The functionality of the present tow claims system is detailed below.

Figure 3:
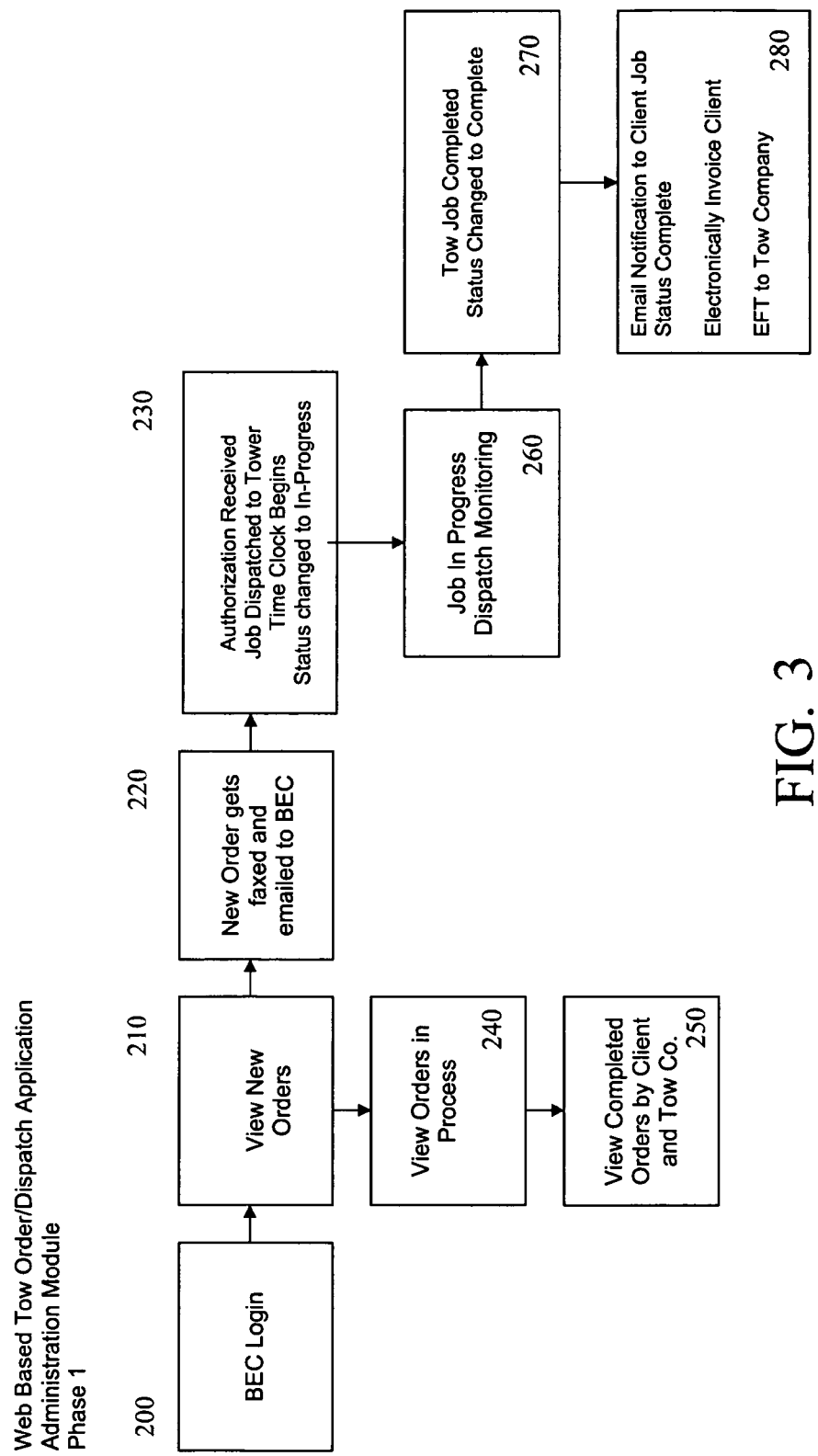
FIG. 3 is a block diagram illustrating the Management Module that allows the Manager 30 to implement and manage the tow claims method via a web portal.

FIG. 3 is a block diagram illustrating the Management Module that allows the Manager 30 to implement and manage the tow claims method via a web portal. This user group manages the system, generates dispatch orders, track orders, approve completed orders for payment, and forward Client 10 and Vendor 20 account management, reports, and performance tracking.

At step 200 the Manager 30 logs into the system using a secure ID and password. At step 210 the Manager 30 is presented with a consolidated screen listing that logs new tow orders and allows management of old (previously-entered) ones.

Figure 4:
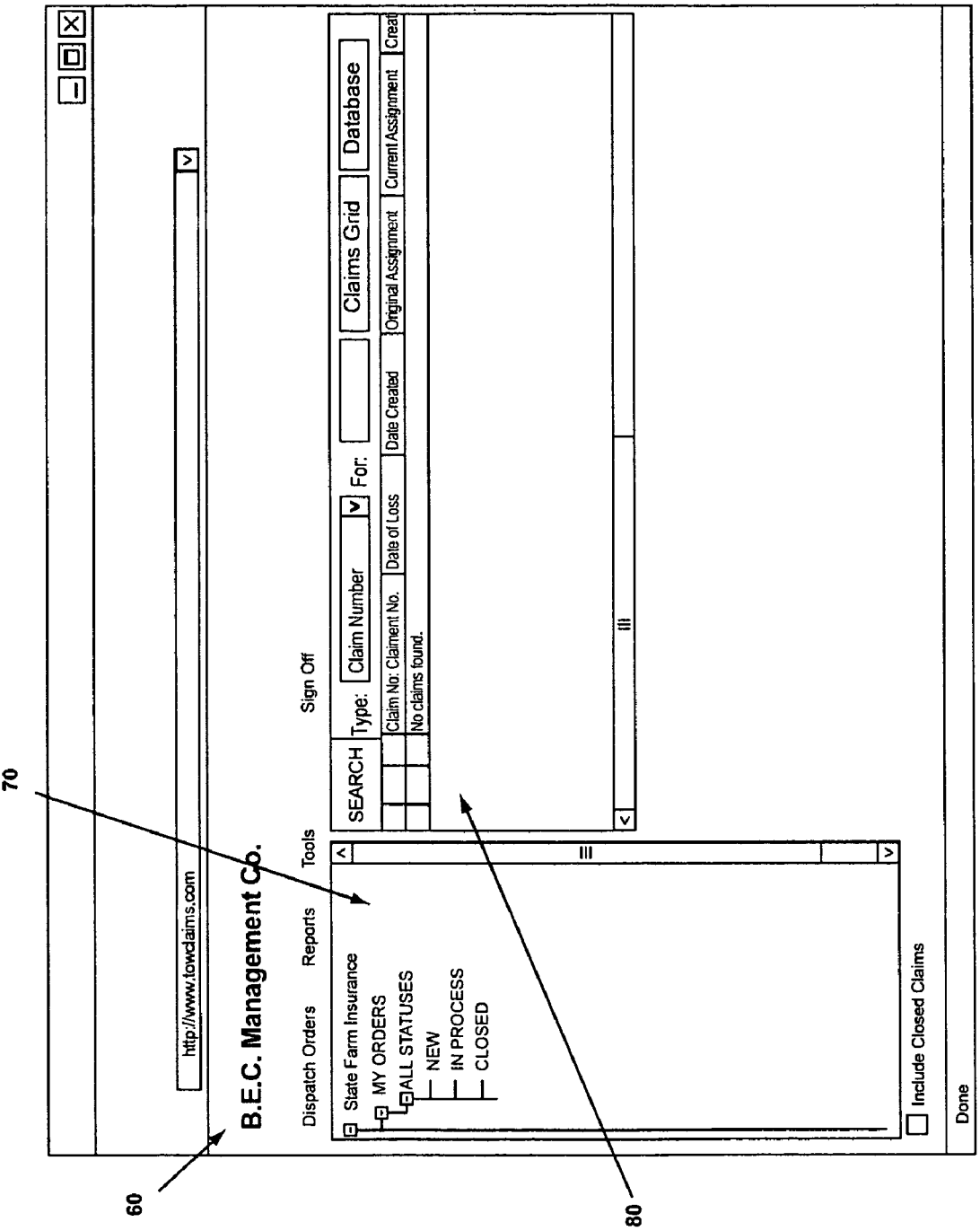
FIG. 4 is a screen print of the Management module consolidated screen listing for tracking tow orders.

FIG. 4 is a screen print of the Management module consolidated screen listing for tracking tow orders. The screen listing is framed in a standard Windows® rectangle, and generally includes a header section 60, a tree-index section 70 at left, and a search section 80 at right. Header section 60 displays the Client 30 logo, login information (at right) including the login name, company and login status. Header section 60 also displays a user menu including four available commands: Dispatch Orders, Reports, Tools, Sign-Off.

By selecting Dispatch Orders from the user menu, the Manager 30 is presented with the display as shown, the tree-index section 70 at left illustrating a hierarchical tree-index of all Client-entered Dispatch Orders for that particular Manager 30, with branches (sub-indexes) for each order status inclusive of "New", "In-Process", and "Closed." The User/Manager 30 can access any particular order by following this index down to it. The search section 80 is a simple SQL search interface for allowing access to desired Dispatch Orders by typing in search strings. Searches may be specified by "Type", and a drop down list of search types is provided such as by claim number. After selecting the search type, boolean text search commands are typed into the "For" box. The user then presses either the Claims Grid or Database buttons to execute the search on either the field names or on the entire database contents (field contents). All matching results are listed directly below.

By accessing an order through either tree-index section 70 or search section 80, the User/Manager 30 can view more detailed information in that Dispatch Order.

Referring back to FIG. 3, at step 230, the Manager receives a Dispatch Order from the Client 10 (who has solicited tow authorization from the vehicle owner). At this point at step 240, the Manager 30 electronically dispatches the Tow Order to the tower Vendor 20, starting the 24-hour time clock. Upon starting the clock the status of the job is changed to "In-Progress". The Manager 30 may at step 240 view all tow orders in process, or alternatively, at step 260 may monitor tow progress of a single tow order. At step 270 when the tow job is completed the job status is changed to "Complete", and at step 280 an Email Notification is automatically generated to the Client 10 notifying them of the Job Status Complete indication. At step 280 the Manager 30 electronically invoices client 10 and collects the funds, whereupon an electronic funds transfer is sent to the Vendor 20. All completed Orders may be viewed by the Manager 30 at step 250, or by the Client 10.

Figure 5:
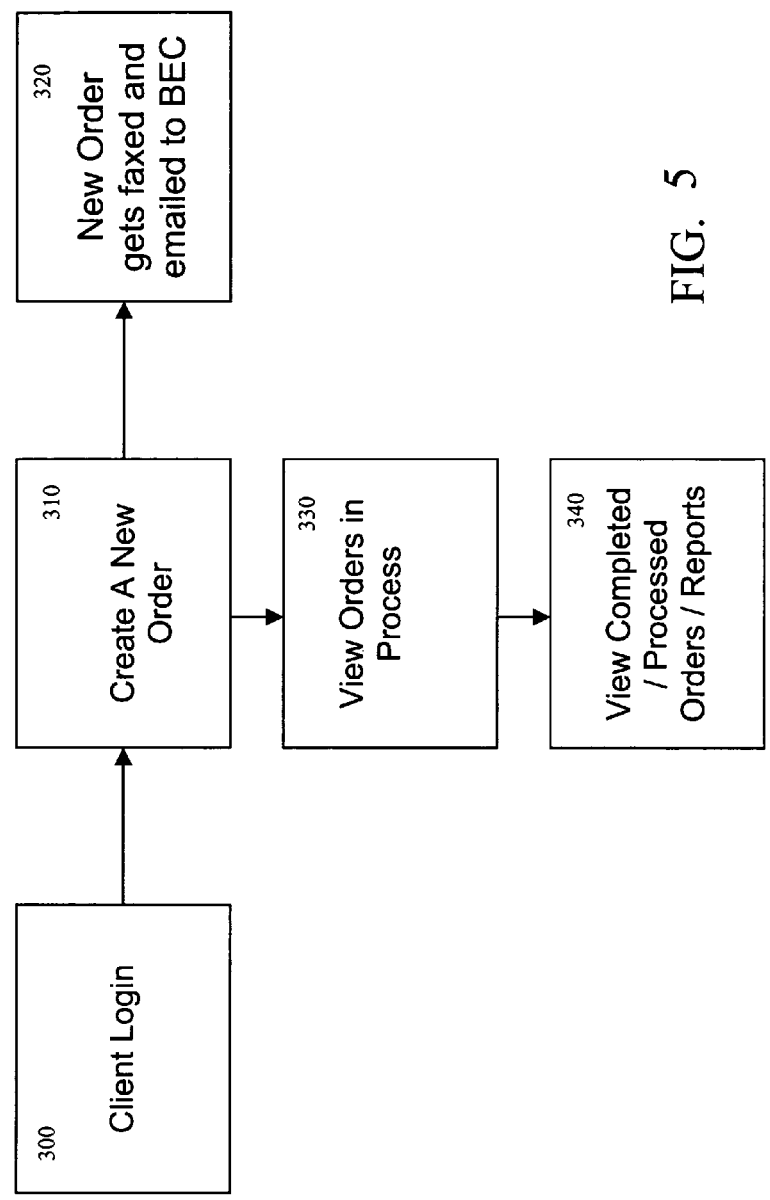
FIG. 5 is a block diagram illustrating the Client Module that allows the Clients 10 to implement and manage the tow claims method via a web portal.

FIG. 5 is a block diagram illustrating the Client Module that allows the Clients 10 to implement and manage the tow claims method via a web portal. Currently, there are two user levels for clients—Claims Adjuster and Manager. The user level is determined at step 300 at login, depending on the user ID entered. The Claims Adjuster login can initiate dispatch orders, track tow dispatch status and view closed claims. The Manager level has all of the capabilities of the Claims Adjuster but also has the ability to view various management reports which track utilization and costs, as will be described.

At step 310, the Client 10 creates a new Order. This is done through the Client 10 module which includes a Dispatch Order entry screen just as shown in FIG. 5 for allowing Clients 10 to enter and/or edit Dispatch Orders. The Dispatch Order entry screen solicits all the foregoing categorical information (with specific fields as described). Only the Client 10 user group may initiate the tow dispatch orders into the system once they have obtained the vehicle release from the vehicle owner.

FIG. 6 is a screen print of the Dispatch Order entry screen for allowing Clients 10 to enter and/or edit Dispatch Orders. The Dispatch Order entry screen is a form that solicits the following categorical information (with specific fields also shown):

DISPATCH ORDER INFO
   Claim No.?

AUTHORIZATION INFO
   Handler (Tower) Alias, Date Tow was Authorized

TOW CHARGES
   Tow Facility Contact
   Date Storage Charges Begin
   Tow Charge
   Daily Storage Rate
   Miscellaneous Charges
   Comments VEHICLE INFORMATION
   Owners Name (Last, First)
   Owner Phone
   Last 6 digits of VIN
   Year
   Make
   Model
   Color
   Damage Area
   Front
   Rear
   Rollover
   Left Front (Use the CTRL key to select more than one area of damage).
   Damage Comments VEHICLE LOCATION
   Tow Lot/Vehicle Location
   Street Address:
   City
   State
   Zip Code:
   Hours of Operation:
   Phone Number:
   Location of keys TOW TO LOCATION
   Facility Name
   Street Address
   City:
   State
   Zip
   Phone Number Upon completing or editing the illustrated information, the Clients 10 simply hits Submit (or Reset to clear the form).

Once completed, at step 320, the new Order is faxed and/or emailed to the Manager 30. At step 330, the Client 10 can view Orders in process by selecting "Status">>"In Process" from the navigation menu (top). This brings up a screen that lists In Process Tow Requests including Claim No., Assigned Date/Time, Tow To Location and Current Vehicle Location. At step 340, the Client can view Completed/Processed Dispatch Orders by selecting "Status">>"Closed" from the navigation menu (top). Additionally, the Client 10 can review closed claims at any time and view the complete order, mileage calculation (via Mapquest™), an Adobe .PDF copy of the original tow receipt, and all details related to the tow. This is essential for auditing by the insurance company Client 10. The same format of information is displayed for closed Dispatch orders.

FIG. 7 is a screen print of the Closed Tow Request review screen for allowing Clients 10 to review closed Dispatch Orders. The Closed Tow Request review screen present a listing of closed tow requests by Claim No., Authorization date/time, Tow To Location, and Vehicle Location (Impound Lot Location). The Client 10 can review the detail for any closed claim listed in FIG. 7 by clicking on the closed tow request Claim No.

FIG. 8 is a screen print of a closed tow detail screen, which displays a full complement of Dispatch Order details inclusive of Vehicle Information, Payout Fees Due, Vehicle Location and Tow Destination.

FIG. 9 is a screen print of the Track Status Screen for allowing Clients 10 to review all open and closed Dispatch Orders. The Track Status Screen presents a listing of all open and closed tow requests by Claim No., allows access to a detailed Invoice Screen, and presents assignment date/time and completion date/time, selected Vendor 20, accident or incident reports, and vehicle tow authorization sign-off. The Client 10 can review the detail for any claim listed in FIG. 9 by clicking on the tow request Claim No., and can similarly review the associated Invoice.

FIG. 10 is a screen print of the Invoice Detail Screen for allowing Clients 10 to review any given Invoice listed in FIG. 9. The Invoice Screen presents a formatted printer-ready Invoice for presentment to the Client 10.

If a Client 10 agent is logged in at the Manager level, they additionally have the ability to view various management reports which track utilization and costs.

Figure 11:
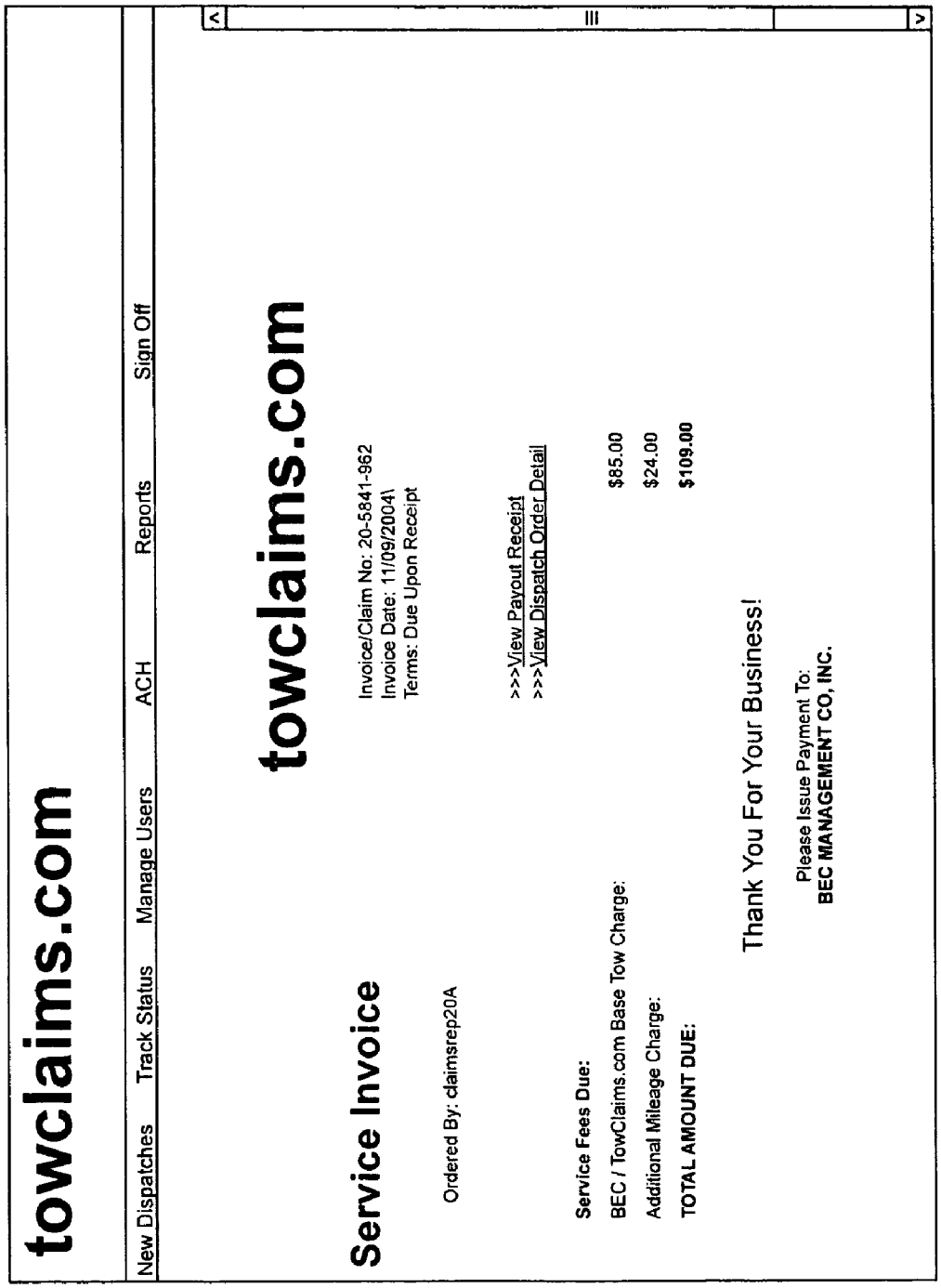
FIG. 11 is a screen print of the Claims Manager Report Order Screen.

FIG. 11 is a screen print of the Claims Manager Report Order Screen, which allows a Manager-level Client 10 to search and format reports filtered by Claim Number, Claims Agent (Handler) ID, Begin Date and End Date. The Manager-level Client 10 simply enters the requisite report filters in the text boxes shown (or drop down lists) and presses GO! to display a screen print of the report.

FIG. 12 is an exemplary Manager-level Client 10 Report generated from the screen of FIG. 11, sorted by date interval, which lists Order Date, Claims Number, Handler ID, Primary Tow Costs, Secondary Tow Costs, Total Cost, Turnaround Time, Tow Mileage, Days in Storage, and Reasons for Increased Secondary Tow Costs. This is specifically the information needed to properly manage secondary tow costs presented in one easily accessible format.

FIG. 13 is an exemplary Manager-level Client 10 Report generated from the screen of FIG. 11, filtered by Handler ID and date interval, which as above lists Order Date, Claims Number, Handler ID, Primary Tow Costs, Secondary Tow Costs, Total Cost, Turnaround Time, Tow Mileage, Days in Storage, and Reasons for Increased Secondary Tow Costs. This information is sorted by Handler ID and gives the information needed to properly manage secondary tow Handlers in one easily accessible format.

Finally, the Tow Company "Vendors" are the actual tow truck companies, and their login allows each tow company to view tow dispatches which have been assigned to them through the TowClaims.com dispatch system. Once the tow dispatch has been completed by the Vendor, they again use their login to complete the tow by entering information such as payout data and time of completion. The Vendor Module allows the Vendors 20 to implement and manage their assigned tow claims via their own web portal. The Vendor 20 can input and track tow dispatch status and view closed claims.

FIG. 14 is a screen print of the Dispatch Order screen for allowing Vendors 20 to service open Dispatch Orders. The In Process Tow screen present a listing of open tow assignments by Claim No., Assignment date/time, Tow To Location, and Vehicle Location (Impound Lot Location). The Client 10 can review the detail for any closed claim listed in FIG. 14 by clicking on the open Claim No.

FIG. 15 is a screen print of a Dispatch Order detail screen, which displays a full complement of Dispatch Order details inclusive of Vehicle Information, Payout Fees Due, Vehicle Location and Tow Destination.

Database Layout

The present database is arranged in thirteen tables each with a plurality of formatted records as shown in FIGS. 16 (A-N), which collectively is a table printout of all database tables listing all fields within each table.

It should now be apparent that the above-described system is a unified secondary tow claims management workflow system for entry, management and use of dispatch data, and specifically for simplifying the workflow of three user groups, towers, insurers and system ASP managers. The simplified data entry and forms generation features along save hours per day and avoids mistakes.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

I claim:

1. A computer-implemented workflow system for simplifying the workflow of attending insurers and towing companies in administering to secondary tow and salvage claims, comprising:

at least one web-enabled server maintained by an application service provider (ASP manager) that houses software comprising an ASP manager workflow management module, a client/insurer workflow management module, and a vendor/tower workflow management module, and a relational database that stores data extracted from said ASP manager workflow management module, said client/insurer workflow management module, and said vendor/tower workflow management module, wherein said ASP manager workflow management module comprises a graphical user interface configured to enter, manipulate, and output, by the ASP manager, information for tow and salvage dispatch orders;

electronically transmit tow assignments to proximate subscribing vendors;

track tow and salvage dispatch orders; and manage reports;

said client/insurer workflow management module comprises a graphical user interface configured to enter, manipulate, and output, by a client/insurer, tow assignment information, payout amount due, and vehicle release authorization details in said relational database for tow and salvage dispatch orders;

electronically transmit tow assignments to said ASP manager;

track a first time within which vehicle release authorization must be obtained from vehicle owner by triggering a first timer once tow assignment data is entered; and track a second time within in which a secondary tow must be completed by an assigned vendor by triggering a second timer once vehicle release authorization is obtained from a remote client/insurer computer; and said vendor/tower workflow management module comprises a graphical user interface configured to enter, manipulate, and output, by a vendor/tower, information in said relational database; and electronically transmit job completion notification to said ASP manager from a remote vendor/tower computer.

2. The computer-implemented workflow system according to claim 1, wherein said ASP manager workflow management module includes a display of consolidated dispatch orders comprising a tree-index section illustrating a hierarchical tree-index of all dispatch orders by each client/insurer having sub-indices of order status inclusive of "New", "In-Process", and "Closed".

3. The computer-implemented workflow system according to claim 2, wherein said ASP manager workflow management module includes a Structured Query Language (SQL) search interface for allowing access to desired dispatch orders by typing in a text search string, whereby an ASP manager can access information for a dispatch order either via said tree-index section or search section to view more detailed information on that dispatch order.

4. The computer-implemented workflow system according to claim 1, wherein said client/insurer workflow management module comprises two permission levels including claims adjuster and ASP manager, determined at a login, said ASP manager level having all capabilities of said claims adjuster plus an ability to view management reports that track utilization and costs.

5. The computer-implemented workflow system according to claim 1, wherein said client/insurer workflow management module comprises a dispatch order entry screen that allows said client/insurers to initiate dispatch orders, including claim number assignment and entry of vehicle owner authorization information, primary tow charges, vehicle information, vehicle location, and tow-to location.

6. A method for managing secondary tow and salvage claims amongst participating clients (insurers), vendors (towers) and a third party manager, comprising the steps of:

providing each participating client, vendor and manager access to a computerized workflow management system comprising at least one web-enabled server that houses software and a relational database, and at least one remote computer for said client, said vendor, and said manager, said software provides a dedicated graphical user interface for each participant to use from the participants' remote computers;

receiving a tow assignment by said client, entering assignment data into said client user interface from said at least one client remote computer of said workflow management system, and storing said assignment data in said relational database;

triggering, by said workflow management system, a first timer once assignment data is entered for tracking a first time within which vehicle release authorization for said tow assignment must be obtained;

said client determining a payout amount due to the impound lot operator for any primary tow, storage fees, and other charges and entering said payout amount into said client user interface from said at least one client remote computer of said workflow management system for associated storage in said relational database in relation to the assignment data;

said client contacting the vehicle owner directly and obtaining a vehicle release authorization and proof of ownership of the vehicle;

stopping said first timer when vehicle release authorization is obtained;

said client entering details of the vehicle release authorization into said client user interface from said at least one client remote computer of said workflow management system for storage in said relational database;

triggering, by said workflow management system, a second timer once the vehicle release authorization is obtained for tracking a second time within which a secondary tow must be completed by the assigned vendor;

electronically transmitting, by said workflow management system, said tow assignment, vehicle release authorization and proof of ownership to said manager;

facilitating a secondary tow by the substeps of,
   mapping, by said manager, a location of the vehicle,
   identifying, by said manager, a proximate subscribing tow vendor,
   calculating, by said manager, secondary tow or salvage charges;
   obtaining, by said manager, electronic payment for the payout amount from the client;
   electronically transmitting, by said workflow management system, the tow assignment to the identified vendor;
   electronically transmitting, by said manager, the payout amount to said identified vendor;
   executing the secondary tow by the following substeps,
     proceeding, by said vendor, to the vehicle location,
     paying, by said vendor, the payout amount to said impound lot operator to have the vehicle released,
     transmitting, by said vendor, confirmation to said manager that the payout amount has been paid, together with an itemized list of payout charges,
     towing, by said vendor, the vehicle,
     stopping said second timer when the towing substep is completed,
     inputting job completion data into said vendor interface from said at least one remote vendor computer of said workflow management system,
     transmitting, by said workflow management system, a job completion notification to said manager;
   whereby said manager submits electronic payment for the secondary tow to the vendor and sends an electronic invoice for same to the client.

7. The method for managing secondary tow and salvage claims amongst participating clients, vendors and a third party manager according to claim 6, wherein said first time is 48 hours.

8. The method for managing secondary tow and salvage claims amongst participating clients, vendors and a third party manager according to claim 7, wherein said second time is 24 hours.

9. The method for managing secondary tow and salvage claims amongst participating clients, vendors and a third party manager according to claim 6, wherein in response to said step of the client contacting the vehicle owner directly, said vehicle owner may provide said release authorization and proof of ownership of the vehicle by one of: 1) physically going to the location of said client; 2) facsimile; 3) email; and 4) 3-way teleconference call between said client, vehicle owner and an impound lot operator.

10. The method for managing secondary tow and salvage claims amongst participating clients, vendors and a third party manager according to claim 6, wherein said vendor must substantiate to said manager any variation in the actual payout amount versus the payout amount transmitted to said vendor in the tow assignment.

11. The method for managing secondary tow and salvage claims amongst participating clients, vendors and a third party manager according to claim 6, further comprising the step of said manager compiling monthly reports and forwarding said reports to said clients and vendors.

* * * * *